United States Patent
Nygard et al.

(10) Patent No.: US 6,657,200 B2
(45) Date of Patent: Dec. 2, 2003

(54) READOUT SYSTEM FOR SOLID-STATE DETECTOR ARRAYS

(75) Inventors: Einar Nygard, Asker (NO); Eldan Halberthal, Mazor (IL)

(73) Assignees: Imarad Imaging Systems Ltd., Rehovot (IL); Integrated Detectors and Electronics (IDE) S.A., Hovik (NO)

( * ) Notice: Subject to any disclaimer, the term of this patent is extended or adjusted under 35 U.S.C. 154(b) by 30 days.

(21) Appl. No.: 09/918,372

(22) Filed: Jul. 30, 2001

(65) Prior Publication Data

US 2003/0160175 A1 Aug. 28, 2003

(30) Foreign Application Priority Data

Jul. 30, 2000 (IL) .................................................. 137580

(51) Int. Cl.[7] .................................. G01T 1/16

(52) U.S. Cl. .............................. 250/370.09; 250/370.08; 250/214 R

(58) Field of Search ....................... 250/370.01, 370.03, 250/370.08, 370.09, 370.1, 370.14, 214 R

(56) References Cited

U.S. PATENT DOCUMENTS

| 5,656,818 A | 8/1997 | Nygard ................... 250/370.09 |
| 6,091,070 A * | 7/2000 | Lingren et al. .......... 250/370.09 |
| 6,236,051 B1 * | 5/2001 | Yamakawa et al. ...... 250/370.1 |

* cited by examiner

Primary Examiner—Constantine Hannaher
Assistant Examiner—Timothy Moran
(74) Attorney, Agent, or Firm—Darby & Darby

(57) ABSTRACT

A signal readout system for a solid state detector array comprising a plurality of detection channels, wherein the decision to output a signal detected by a channel is determined by the content of that channel.

12 Claims, 3 Drawing Sheets

READOUT SYSTEM FOR SOLID-STATE DETECTOR ARRAYS

FIELD OF THE INVENTION

The present invention relates to the field of electronic circuitry for the coincidence readout of solid-state detector signals, especially for application in the field of nuclear medical imaging.

BACKGROUND OF THE INVENTION

In the field of nuclear medical imaging, solid state detectors are frequently used in order to directly detect the incidence of high energy photons, either those transmitted through the body from a high energy source, such as an X-ray source, or those emitted from radioactive isotopes injected or ingested into the body of a patient. In gamma-ray imaging applications, the detectors must typically be able to determine the energy of the gamma-ray photons emitted from the patient, and the position of incidence on the detector array.

In positron emission tomography (PET), also known as electronic collimation, isotopes that emit positrons are injected or ingested into the body of the examined patient. Each of the emitted positrons annihilates with an electron to produce a pair of 511 Kev photons propagating along the same line but in opposite directions and out of the patient's body. The 511 Kev photons are detected by a camera which has two separate detector heads, which determine the position where the photons interact with the detector heads and the energy of these interacting photons using coincidence detection methods. Photons of the same pair are emitted simultaneously. Accordingly, the detection time of one photon of a pair should differ from the detection time of the second photon, only by a small time interval, $\Delta t$ which depends, among other factors, on the time resolution of the system, and on the different time of flight of each photon to its corresponding detector head. The rate of the measured events in the detector heads determines the average time $\Delta T$ between two followings events. Two photons are considered as being related to the same pair when they are detected by the two different detector heads of the camera within a time difference $\Delta t$, which satisfies the condition $\Delta t < \Delta T$. The coincidence method is based on the detection of the time of the first impacting photon, and the use of that temporal information in deciding whether the following impacting photon is related to that event or not. If the criteria for coincidence are met, a coincidence trigger pulse is generated for informing the signal detection channels to process the signals accordingly.

Another form of gamma ray imaging is known as Single Photon Emission Computerized Tomography, or SPECT. In this method, lower energy photons are detected, such as the 140 keV photons emitted by the decay of Technecium-99 or Thallium-201 previously injected or ingested into the body. In this method, the photons emitted from the body of the patient are typically passed through a lead collimator, in order to ensure that only photons propagating in a straight line are used to produce the image, so that the image is a true representation of the source.

The detectors used in such imaging cameras are constructed of arrays of separate detection modules, each of which itself may have an array of several hundred separate detection areas, typically in the form of pixellated anodes. In a commonly used configuration, each module has 256 individual anodes, and each anode is connected to its own charge sensitive amplifier and signal processor, such that each is an effectively independent detector. Multiple detector readout channels from one module are often integrated into an ASIC (Application Specific Integrated Circuit). Each pixellated detector circuit is able to determine three pieces of data associated with the photons it detects:

(a) the point in time of the photon impact, known as the trigger time, this being important for the coincidence type of measurement;

(b) the energy of the impacting photon, determined from the amount of charge collected; and (c) the position of impact, determined by means of an address which the detection channel of each anode pixel transmits together with the detection data it has collected.

A threshold level is used to discriminate between random noise in the detector, and a real incident photon. Since the detection channel associated with each detector pixel is only able to handle one detection event at a time, the detection circuitry must be programmed to reject any signals arriving substantially simultaneously in one ASIC from multiple photon impacts in the module. Substantially simultaneously is defined as being within the time taken for the detection circuitry to process and measure the arriving photon. In such a situation, the arrival of a second photon within the coincidence time, (generally of the order of up to tens of nanoseconds) of a first photon causes both signals to be rejected, in order to prevent corruption of the data of either of the photons. This process is known in the art as "pile-up rejection".

Because of the advisability of using low doses of radiation in the patient, the flux of imaging photons detected is very low. Furthermore, in SPECT imaging, the collimator typically transmits only $10^{-4}$ of the incident flux, such that the detected flux is even further reduced. The importance of utilizing every piece of imaging information in the photon flux is thus of great importance, and every effort should be made not to lose any such information because of detection limitaitons.

As a result of the low flux levels used, simultaneous impact from the patient in a single module or ASIC, whether from direct emission or from Compton scattering within the patient's body, is infrequent. In a single detector channel, this eventuality is even rarer. As a result, the process of pile-up rejection does not generally result in the loss of any significant data from source scattering or simultaneous emission.

However, there are two other processes which can result in the loss of imaging information from the incident flux of photons from the patient's body. Firstly, Compton scattering can occur, not only in the patient's body, but also in the detector bulk itself. This is a much more common phenomenon, and much more serious, as it can affect an appreciable percentage of all photon detection events. When this occurs, the incoming photon makes an initial impact within the detector, and gives up part of its energy in producing a charge of excited electron-hole pairs. The electrons in this cloud of charge then drift towards the anode under the influence of the field present in the detector, and appear on the anode opposite the point of first impact. The secondary scattered photon continues its path within the detector, at a lower energy, until it makes a second impact within the detector bulk, again resulting in another cloud of carriers, the electrons of which are collected at the closest anode. This anode may be in a pixel a considerable distance from the pixel of the initial impact, especially for high energy photons. (The hole motion has been neglected for the purposes of this explanation). As a result of this process, the primary and secondary impacts are detected by different pixels at different times in the detector module. Furthermore, they each have a different energy, as the energy of the incident photon is shared between the two impacts, and neither therefore has the expected energy of the emitted photon.

The second process which can result in the loss of imaging information, occurs when a photon impacts the detector very close to the border between two pixels. This is known as sharing. When this happens, the cloud of charge carriers is approximately divided between two neighboring pixels, and some of the electrons are collected by one anode, and others by the neighboring anode. The incident photon is thus measured as if it were two separate impacts, in neighboring pixels, neither of which has the characteristic photon energy sought for constructing the image, and this event too would be rejected from the imaging process.

Sharing can be even more complex if the impact occurs near the junction of four pixels, in which case the photon energy detected is shared between four anodes. Furthermore, sharing can occur in combination with inter-detector Compton scattering, thus further complicating the issue of relating the charge signal measured by each pixel with the energy and location of an incoming photon.

A result of either of the above processes or of their combination, is that a single incident photon of the correct energy for use in the image reconstruction, may appear to be detected as a number of photons of lower energy, impacting the detector at a number of different locations, and at different times. It would be important to be able to collect all of the impact data, and from the location and energy of the events detected, to determine whether the original photon incidence is useful for constructing the image. In order to do this, it is necessary to be able to provide accurate readouts of a number of apparently multiple events occurring at very close intervals.

In prior art methods, in order to avoid confusion between different detected events, the first apparent photon detected over the threshold level is fully measured, i.e. its time of arrival and its location are recorded, and its energy measured. Immediately after the impact, the signal detection circuits in that module are blocked, to avoid corrupting the data being measured by another photon impact, which in the situation described above, could be a secondary impact of the same photon, or a result of charge sharing, or both. The required blocking time for this process is the time taken to process the data arising from an impact, and is dependent on the electronic circuits used, but typically ranges from less than 1 microsecond to over 10 microseconds.

As a result of the blocking process, the second or later apparent impacts are rejected, since the blocking time may well be longer than the arrival time of secondary or shared charges. Since, however, because of dosing considerations, the incident flux from the patient is low, it would be very advantageous not to lose any imaging information carried by either of the photons, as mentioned above. Therefore, methods have been derived in the prior art whereby both of the apparent scattered photons are detected and used in generating the image required.

One commonly used prior art method relies on a process of freezing all of the information accumulated a certain time after an impact is detected, and then serially scanning the charges accumulated by all of the pixels in the vicinity of the impact pixel, and sending the information for processing. This method has a number of disadvantages. Firstly it is slow because of the serial method of scanning, and because of the large number of pixels that have to be scanned. For low energy photons, it is usually sufficient to scan only the eight nearest neighbors of the impact pixel, but for high energy photons, the scattered photons may reach a much wider area. Secondly, it is electronically complicated to perform, and is noisy.

Another method of reading all of the scattered photon information from a single event is described in U.S. Pat. No. 5,656,818, to one of the present inventors, hereby incorporated by reference in its entirety. This method uses a single channel data transfer method, whereby all of the channels are commonly controlled with a single reset. This method thus has the disadvantage that it is comparatively slow, that it has no multi-channel readout ability, and that it has no coincidence measurement facility.

There therefore exists a serious need for a method and apparatus for reading out the charge signals detected by a solid state detector, in such a manner that even closely occurring multiple events such as temporally closely detected photons arising from scattering within the detector bulk, are all read in a speedy and efficient manner, without the loss of imaging information because of any significant dead time.

The disclosures of all publications mentioned in this section and in the other sections of the specification are hereby incorporated by reference, each in its entirety.

SUMMARY OF THE INVENTION

The present invention seeks to provide a new electronic signal processing system that can detect, amplify, noise-filter and transfer electronically to an external Data Acquisition System (DAQ), the position, signal amplitude and timing of charge signals arising as a result of impinging photons or charged particles on a solid state radiation detector array consisting of a plurality of pixellated sensor elements. The system is coincidence-enabled, and also allows more than just one detector element of a detection array module to be read-out simultaneously, and at a high rate. The other detector elements of interest to be read out may preferably be the elements immediately surrounding the primary element, such as results from event sharing, or elements significantly further away such as those caused by high energy Compton scattering within the detector.

There is thus provided in accordance with a preferred embodiment of the present invention, a system consisting of a plurality of individual detection channels that coexist with other identical parallel detection channels, arranged in a multichannel structure, in which all of these independent detector channels share a common readout architecture. Such a multichannel structure is called a Chip-on-board (COB) unit, and the number of parallel channels in a single COB unit is typically a few hundred. Physically, each COB unit is typically integrated in a single ASIC. According to this preferred embodiment of the present invention, all of these independent detector channels are kept open in a ready state to receive the input of a detected event. When such an event is detected and read-out in any single channel, only the channel reading the data is blocked from receiving another set of data. This blocking is preferably performed by a self-generated process. All of the other channels are still ready to receive data from a different detected event. When the active channel has completed processing and transferring its received data, it resets itself without any external interference or command. If the event detected by that channel was not a coincidence event, then the channel resets itself after a predetermined internal decay time of the data.

A further advantage arising from the above-mentioned properties, is that the system can operate at a higher rate than prior art detection systems, since all of its detection channels, other than those currently measuring an event, are always open and waiting to receive a new event, without the need for any comparatively time-consuming common reset signal.

In a complete gamma-camera, there are generally many identical COB units. The system of the present invention may be advantageously used for processing and reading out the signals from a gamma camera, such as that described in the co-pending Israel Patent Application for a Coincidence Gamma Ray Detector, some of whose inventors are inventors of the present application.

It should be pointed out, though, that this invention is not limited to Nuclear Medicine and gamma-ray detection. The electronic architecture can advantageously be used also with other types of sensors and types of radiation other than gamma-rays, and for detecting multiple impacts of charged particles.

In accordance with yet another preferred embodiment of the present invention, there is provided a signal readout system for a solid state detector array consisting of a plurality of detection channels, wherein the decision to output a signal detected by a channel is determined by the content of that channel.

There is further provided in accordance with yet other preferred embodiments of the present invention, a signal readout system as described above, wherein the decision also depends on the presence of an external signal, which could be a coincidence signal derived from the outputs of at least two heads of a coincidence gamma camera, or a fixed signal.

In accordance with still another preferred embodiment of the present invention, there is provided a signal readout system for a solid state detector array, consisting of a plurality of detection channels, and a switching network, wherein the switching network outputs data simultaneously from at least two of the plurality of detection channels. That data could be output in parallel.

There is further provided in accordance with still another preferred embodiment of the present invention, a signal readout system as described above, and wherein those of the plurality of detection channels which are not outputting data are in an effectively continuous state of readiness to receive data from a further detected signal.

In accordance with a further preferred embodiment of the present invention, each of the plurality of detection channels outputs data independently of the status of the other ones of the plurality of detection channels.

There is also provided in accordance with a further preferred embodiment of the present invention, a signal readout system as described above, and wherein the switching network consists of an arbitrator and a plurality of multiplexer units, the arbitrator directing the outputs of at least two of the plurality of detection channels into at least two of the plurality of multiplexer units according to the content of the at least two detection channels.

In accordance with yet another preferred embodiment of the present invention, there is provided a signal detection channel for use in a readout system for a solid state detector array, consisting of a peak-and-hold circuit operative for capturing the signal, and wherein the peak-and-hold circuit is made operative according to a trigger signal generated according to the content of the signal detection channel itself.

Furthermore, in accordance with yet more preferred embodiments of the present invention, the trigger signal is generated according to the content of the signal detection channel itself only when an external signal is present, and that external signal may be a coincidence signal derived from the outputs of at least two heads of a coincidence gamma camera, or a fixed signal.

In accordance with yet another preferred embodiment of the present invention, there is provided a method of reading out signals from a solid state detector array having detector elements, consisting of the steps of providing a plurality of detection channels, essentially one for each element of the array, and outputting a signal detected by a channel according to the content of that channel.

There is further provided in accordance with yet another preferred embodiment of the present invention, a method of reading out signals from a solid state detector array having detector elements, consisting of the steps of providing a plurality of detection channels, essentially one for each element of the array, and a switching network, and causing the switching network to output data simultaneously from at least two of the plurality of detection channels.

In accordance with still another preferred embodiment of the present invention, there is provided a method of reading out signals from a signal detection channel of a solid state detector array, consisting of the steps of providing the signal detection channel with a peak-and-hold circuit, and capturing the signal using the peak-and-hold circuit according to a trigger signal generated according to the content of the signal detection channel itself.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
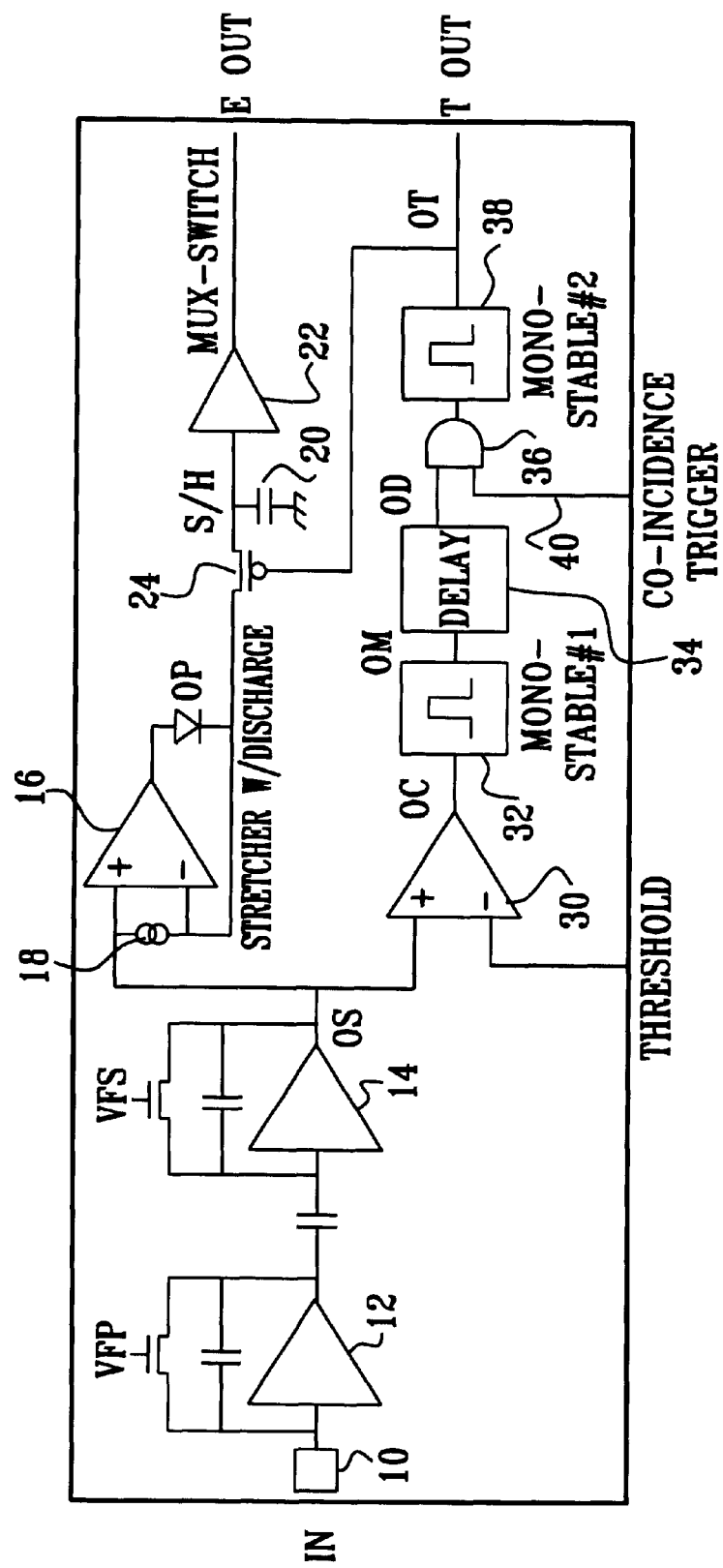
FIG. 1 is a schematic illustration of a single detection channel of the signal processing circuit of the charge signal readout system according to a preferred embodiment of the present invention.

Reference is now made to FIG. 1, which is a schematic illustration of a single detection channel of the signal processing circuit of the charge signal readout system according to a preferred embodiment of the present invention. The signal output from the detector pixel associated with the shown detection channel is input 10 to a charge-sensitive preamplifier 12 followed by a shaping filter (shaper) 14 that together amplify and shape the charge-signal into a semi-Gaussian pulse at the output OS.

After the shaper, the signal path is split in two branches. At the input to the upper branch is a peak-hold device (or stretcher) 16 that provides a well-defined high level ("upper-side") envelope for the semi-Gaussian pulse. The stretcher 16 provides at its output, marked OP, a reasonably flat, plateau signal close to the peak of the semi-Gaussian shape, in order to reduce the effects of time-walk due to time-jitter in the sampling-time. In order to allow the stretcher to return to baseline within a predetermined decay time, a current leakage device 18 is preferably placed between its inputs. An alternative preferred method is the use of an RC circuit, with a suitable decay time constant. Alternatively and preferably, a local reset by means of a switching device may be used.

Following the stretcher is a track-hold device, shown as a sample-and-hold capacitor 20, and an output buffer 22. The output signal, $E_{out}$, collected on the sample-and-hold capacitor, is peak-amplitude analog voltage signal proportional to the signal charge, and is output from the detection channel to the multiplexing switching circuits, to be described hereinbelow, for utilization as required in the DAQ circuitry.

The lower branch consists of a level-sensitive discriminator 30, followed by a first edge-triggered monostable flip-flop 32, a time-delay circuit 34, a coincidence AND-gate 36 and a second edge-triggered monostable flip-flop 38. The discriminator 30 compares the output pulse of the stretcher with a preset and adjustable threshold level. If the signal rises above this threshold level, the discriminator output, marked OC, goes high until the pulse falls below the threshold again. The output OM of the first monostable 32, and the delay circuit 34 together produce at OD a relatively short pulse occurring at a fixed delay after the leading edge of the discriminator output. This pulse is used as the local timing signal for this channel. The pulse width output by the monostable 30 should be approximately equal to the total time-jitter (time-walk uncertainty) of the discriminator pulse. If the system is used for coincidence (PET) applications, the AND-gate 36 only allows this local trigger signal to output if it temporally overlaps the external coincidence trigger signal 40 supplied by the PET camera heads. For non-coincidence applications (SPECT), the external coincidence signal is preset high, so that the local trigger signal is always output. (Even when not used for coincidence event detection, the system still has the advantages of being able to detect multi-events and at a higher rate than with prior art systems.

If there is a coincidence signal, or if the coincidence trigger input is held high, a new fixed width trigger pulse is generated at the output OT of the second monostable 38. The width of this pulse should be made approximately equal to the transfer time of the data from this channel of the COB unit to the external DAQ. This pulse is output as $T_{out}$ to the multiplexing switching circuits to be described hereinbelow.

The trigger pulse is also passed back to the upper branch where it is used to hold gate 24 off for the period of the pulse. During that time, the output signal of the stretcher, which should be very close to the peak of the signal, is held at a fixed level in the sample-and-hold capacitor 20, since its discharge passage is blocked by the gate which is off, and is output to the multiplexing switching circuits, as previously mentioned.

Figure 2:
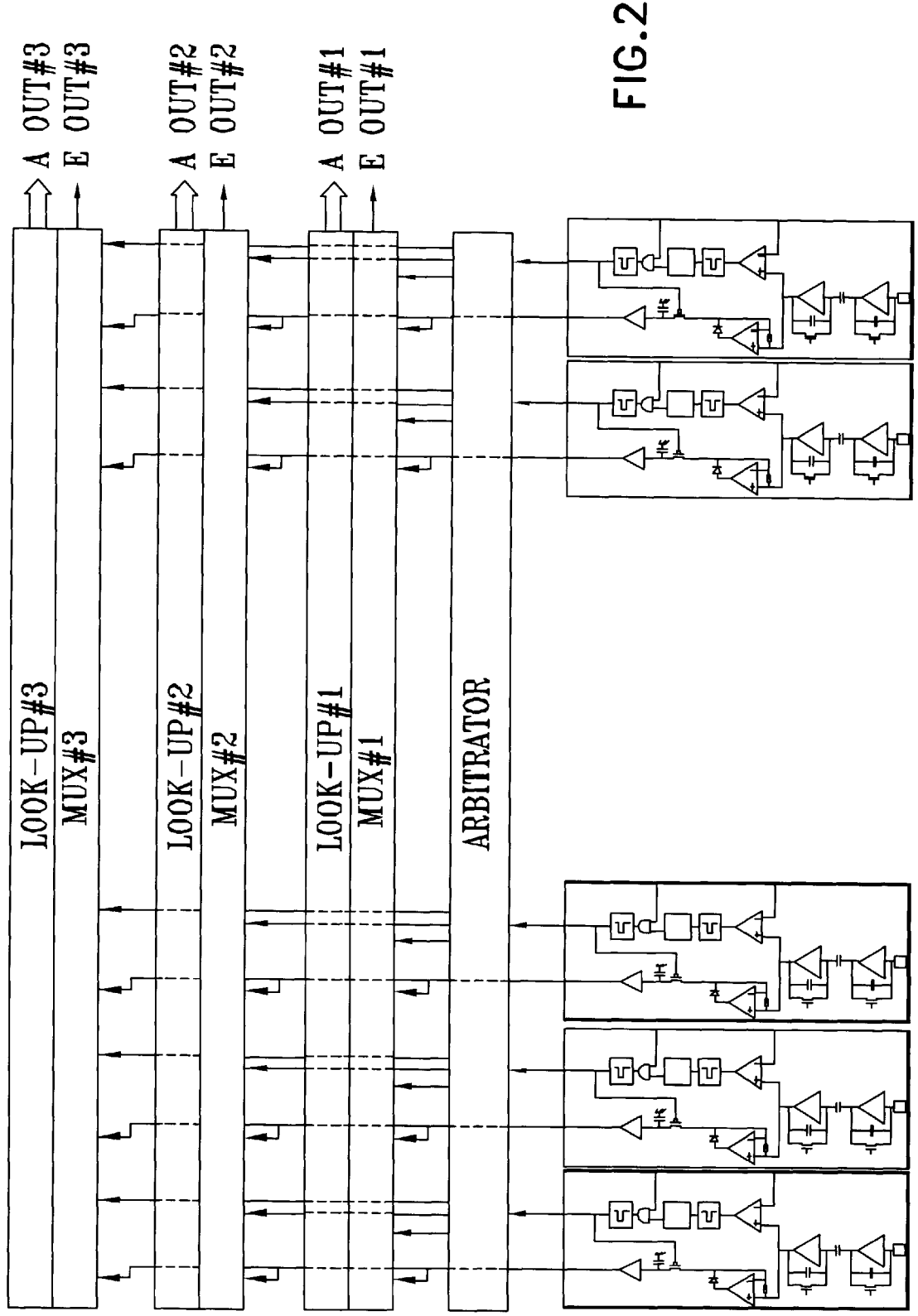
FIG. 2 is a schematic block diagram of the overall architecture of a complete multichannel charge signal readout system according to another preferred embodiment of the present invention.

Reference is now made to FIG. 2, which is a schematic block diagram of the overall architecture of a complete multichannel charge signal readout system according to another preferred embodiment of the present invention, incorporating a plurality of the type of detection channel circuits shown in FIG. 1. All the detection channel circuits 50, in a COB unit, share a common readout module 52. The trigger pulse outputs $T_{out}$ of all of the channels are input in parallel to a clockless arbitrator 54, whose function is to sort the data from each of the channels, directing it into a small number of different mutiplexer/look-up units 56. In FIG. 2, three such Mux/Look-up units are shown, and in practice, four units is generally the maximum required. The analog signal amplitude outputs $E_{out}$ are fed in parallel to the Mux/Look-up units, and the arbitrator makes the decision as to which signals are output to the external DAQ, only according to which channels are outputting a coincidence signal.

In general, if only one channel has a coincidence trigger, the purpose of the readout module is simply to transfer two pieces of data to the external DAQ system: the amplitude signal $E_{out}$ of that channel via an analog multiplexer, and the trigger in the form of a binary address via a ROM look-up table. In such a case, only a single Mux/Look-Up is needed, such as that marked Mux/Look-Up#1 58 in FIG. 2, and the data is transferred on the outputs $E_{out}/A_{out}$#1. Such single channel data transfer is described in the U.S. Pat. No. 5,656,818, mentioned hereinabove.

According to a preferred embodiment of the present invention, the architecture of the signal processing system can transfer data from more than one channel at a time. If more than one channel in a COB unit generates a coincidence trigger simultaneously, the arbitrator is programmed to sort the data from the triggered channels, based on predetermined priority rules, into different Mux/Look-up units.

Figure 3:
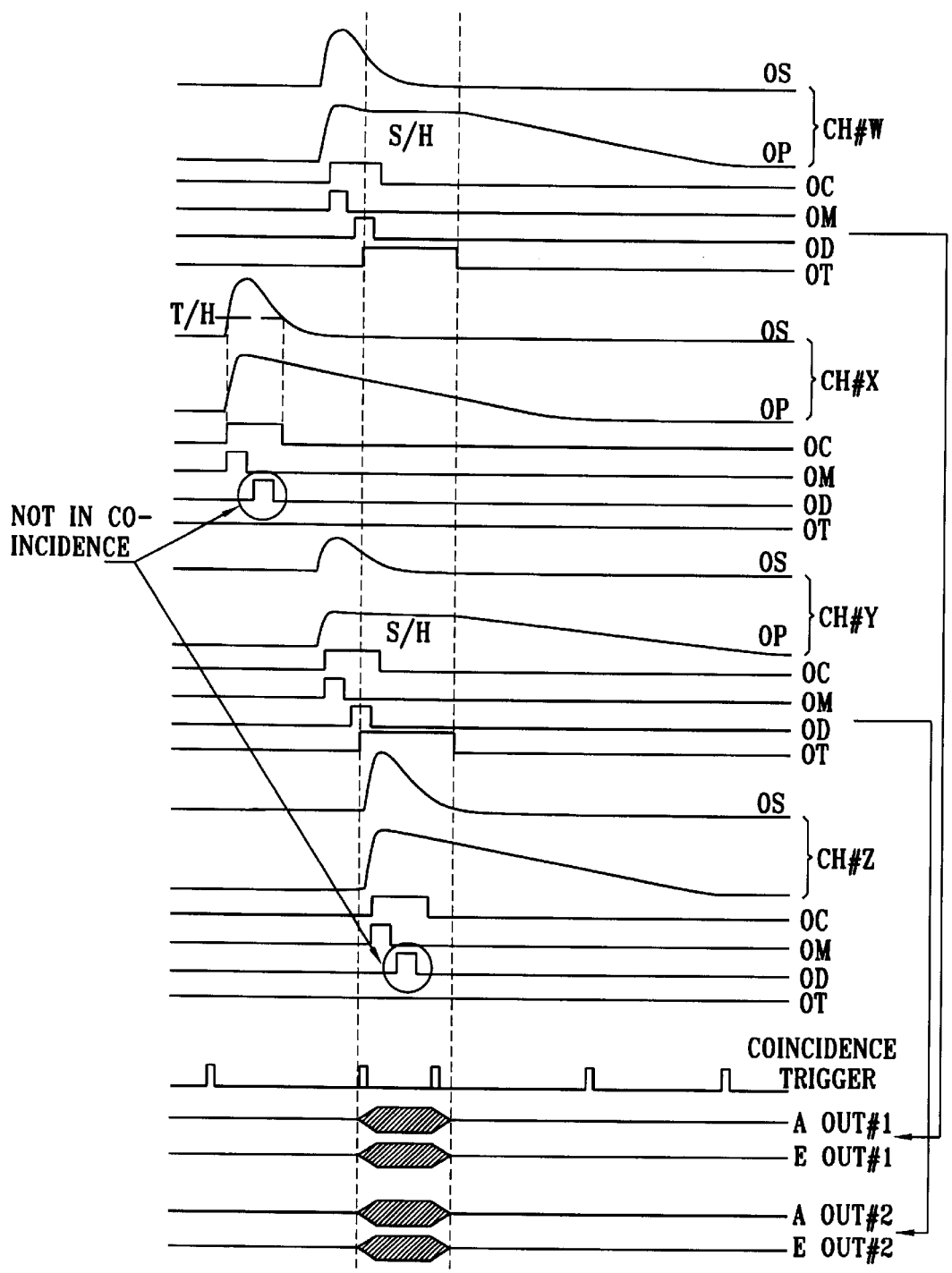
FIG. 3. is a timing diagram illustrating the method by which signals from each channel are processed, and how the signals from multiple detector elements are compared in parallel, and output for display processing, according to a preferred embodiment of the present invention.

Reference is now made to FIG. 3, which is a timing diagram illustrating the method by which signals from each channel are processed, and how the signals from multiple detector elements are processed in parallel, according to preferred embodiments of the present invention. FIG. 3 shows the sequence of signals within four separate detection channels of the signal processing circuit, marked Ch#W, Ch#X, Ch#Y and Ch#Z. The identifying letters at the right hand end of each trace are those used in FIG. 1 to identify the signals at different points in the detection channel.

Referring for instance to channel #W, OS represents the shape of the pulse signal following preamplifying and shaping. For as long as the signal OS is above the predefined threshold level, the pulse OC is high, as is shown. OM is the pulse generated by the first monostable, and OD is generated at a time determined by the delay circuit following the rising edge of pulse OM. Since in the example shown in Channel #W, a coincidence trigger signal is present during the time that OD is high, as shown in the trace marked "coincidence trigger" at the bottom of FIG. 3, a local trigger pulse, OT is generated for directing the rest of the circuitry that a coincidence event is occurring. The analog signal in the sample-and-hold capacitor is held at a constant level, as shown in section S/H of trace OP, and this signal is output as the energy detected in that channel $E_{out}$.

In contrast to the sequence of events in channel #W, channel #X shows the situation arising when no coincidence event occurs with the signal of channel #X. Since there is no coincidence trigger present while OD is high, no local trigger pulse, OT, is generated for outputting to the arbitrator, and the analog signal OP need not therefore be held at its peak level for outputting to the DAQ.

In a similar manner, channel #Y shows another coincidence event, and channel #Z, another non-coincidence event.

The data from channel #W is directed by the arbitrator into Mux/Look-up#1, from where it is output as $A_{out}$#1 and $E_{out}$#1, and the data from channel #Y into the next free unit, Mux/Look-up#2, from where it is output as $A_{out}$#2 and $E_{out}$#2. These outputs are shown in the traces at the bottom of FIG. 3. Since channel #X and channel #Z have detected non-coincidence events, their signals are not output to the DAQ, and only the first two Multiplexer/Look-up units are utilized.

The coincidence gamma camera application does not require many channels to be read out simultaneously. It is extremely unlikely that there be more than four channels in simultaneous coincidence, and any situation with a higher number than this can be ignored. Consequently, a system with four Mux/Look-up unit is sufficient for the application. Other preferred embodiments, for use with other applications, may, however, require a higher number of coincidental readout channels. A multiplicity unit (not shown in the Figures) could be used to let the DAQ know the number of triggers actually generated at one time, so that in the event of more than four channels of simultaneous triggers, a command to ignore the events be given.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A signal readout system for a solid state detector array, comprising:

a plurality of detection channels; and a switching network comprising an arbitrator and a plurality of multiplexer units, wherein said arbitrator directs the outputs of at least two of said plurality of detection channels into at least two of said plurality of multiplexer units according to the content of said at least two detection channels, such that data are output simultaneously from at least two of said plurality of detection channels.

2. A signal readout system according to claim 1, and wherein said data output simultaneously from at least two of said plurality of detection channels, is output in parallel.

3. A signal detection channel for use in a readout system for a solid state detector array, comprising a peak-and-hold circuit operative for capturing said signal, and wherein said peak-and-hold circuit is made operative according to a trigger signal generated according to the content of the signal detection channel itself.

4. A signal detection channel according to claim 3, and wherein said trigger signal is generated according to the content of the signal detection channel itself only when an external signal is present.

5. A signal detection channel according to claim 4, and wherein said external signal is a coincidence signal derived from the outputs of at least two heads of a coincidence gamma camera.

6. A signal detection channel according to claim 4, and wherein said external signal is a fixed signal.

7. A method of reading out signals from a signal detection channel of a solid state detector array, comprising the steps of providing said signal detection channel with a peak-and-hold circuit, and capturing said signal using said peak-and-hold circuit according to a trigger signal generated according to the content of said signal detection channel itself.

8. A signal detection channel for use in a readout system for a solid state detector array, comprising a peak-and-hold circuit operative for capturing said signal, and wherein said peak-and-hold circuit is made operative according to a trigger signal, said trigger signal being generated according to the content of said signal detection channel itself and only when an external signal is present.

9. A signal readout system according to claim 8, and wherein said external signal is a coincidence signal derived from the outputs of at least two heads of a coincidence gamma camera.

10. A signal readout system according to claim 8, and wherein said external signal is a fixed signal.

11. A method of reading out signals from a solid state detector array having detector elements, comprising the steps of:

providing a plurality of detection channels, essentially one for each element of said array, at least two of said detection channels each comprising a peak-and-hold circuit; and providing a switching network operative to output data simultaneously from said at least two of said detection channels;

wherein each of said peak-and-hold circuits captures the signal in its associated detection channel according to a trigger signal generated in accordance with the content of the detection channel itself.

12. A signal readout system for a solid state detector array comprising a plurality of detection channels, wherein the decision to output a signal detected by a channel is determined by the content of that channel and by the presence of an external signal, said external signal being a coincidence signal derived from the outputs of at least two heads of a coincidence gamma camera.

* * * * *